United States Patent [19]
Liston et al.

[11] Patent Number: 5,801,317
[45] Date of Patent: Sep. 1, 1998

[54] OXYGEN/CARBON DIOXIDE SENSOR AND CONTROLLER FOR A REFRIGERATED CONTROLLED ATMOSPHERE SHIPPING CONTAINER

[76] Inventors: Max D. Liston, 76 Seton Rd., Irvine, Calif. 92715; Todd I. Harrison, 2901 W. First St., Space 28, Santa Ana, Calif. 92703; Paul K. Hsei, 20491 Greystone La., Huntington Beach, Calif. 92646

[21] Appl. No.: 840,331

[22] Filed: Apr. 28, 1997

Related U.S. Application Data

[63] Continuation of Ser. No. 603,863, Feb. 22, 1996, abandoned, which is a continuation of Ser. No. 374,876, Jan. 19, 1995, Pat. No. 5,623,105, which is a continuation of Ser. No. 113,428, Aug. 26, 1993, abandoned, which is a division of Ser. No. 964,937, Oct. 21, 1992, abandoned.

[51] Int. Cl.$^6$ .............. G05B 15/00; A61L 9/00
[52] U.S. Cl. .............. 73/863.81; 73/1.06; 62/78; 99/468; 422/3; 422/83; 426/231; 426/418; 426/419
[58] Field of Search .............. 73/1.06, 31.01, 73/863.11, 863.81; 62/78; 99/468; 422/3, 4, 25, 40, 83–112, 256; 426/231, 418, 419

[56] References Cited

U.S. PATENT DOCUMENTS

| | | |
|---|---|---|
| 1,819,643 | 8/1931 | Fleisher . |
| 2,617,275 | 11/1952 | Goff et al. . |
| 2,924,713 | 2/1960 | Liston . |
| 3,102,777 | 9/1963 | Bedrosian et al. . |
| 3,130,302 | 4/1964 | Liston et al. . |
| 3,205,049 | 9/1965 | Lannert et al. . |
| 3,360,380 | 12/1967 | Bedrosian . |
| 3,445,194 | 5/1969 | Thomas et al. . |
| 3,487,769 | 1/1970 | Dixon . |
| 3,508,881 | 4/1970 | Hagenauer et al. . |
| 3,536,370 | 10/1970 | Evans et al. . |
| 3,547,576 | 12/1970 | Sheikh . |
| 3,712,114 | 1/1973 | Osborn .............. 73/38 |
| 3,714,828 | 2/1973 | Durkan .............. 73/861.19 |
| 3,725,012 | 4/1973 | Gower .............. 422/40 |
| 3,937,847 | 2/1976 | Elkins et al. .............. 422/40 |
| 3,957,076 | 5/1976 | Jamison et al. . |
| 4,212,891 | 7/1980 | Fujita et al. . |
| 4,228,197 | 10/1980 | Means . |

(List continued on next page.)

FOREIGN PATENT DOCUMENTS

| | | |
|---|---|---|
| 28492 | 8/1930 | Australia . |
| 0136042 | 4/1985 | European Pat. Off. . |
| 0358359 | 3/1990 | European Pat. Off. . |
| 0380453 | 8/1990 | European Pat. Off. . |
| 0315309 | 1/1995 | European Pat. Off. . |
| 2665828 | 2/1992 | France . |
| 2631749 | 2/1977 | Germany . |
| 55-160849 | 12/1980 | Japan . |
| 59-14779 | 7/1982 | Japan . |
| 2138949 | 10/1984 | United Kingdom .............. 73/1.06 |

OTHER PUBLICATIONS

*Airplay*, "Controlled Atmosphere Challenge For Flying Fruit"; Apr. 4, 1991; p. 39.

*Primary Examiner*—Hezron E. Williams
*Assistant Examiner*—Daniel S. Larkin
*Attorney, Agent, or Firm*—Stetina Brunda Garred & Brucker

[57] ABSTRACT

A controller for use in a system employing selective permeable membrane technology to maintain a controlled atmosphere within a refrigerated container. The controller is electrically interfaced to an oxygen and carbon dioxide sensing device which is disposed within the container and capable of withstanding severe environmental conditions to measure the levels of oxygen and carbon dioxide within the container. The controller maintains preset levels of oxygen and carbon dioxide within the container and is adapted to calibrate the carbon dioxide and oxygen sensing devices as well as check for proper operation of the sensing devices and default to safety conditions when a failure is detected. The controller is further adapted to control the atmosphere maintenance system in a manner adapted not to increase the peak power requirements of the system.

8 Claims, 3 Drawing Sheets

U.S. PATENT DOCUMENTS

| | | | |
|---|---|---|---|
| 4,336,721 | 6/1982 | Curtis | 73/863.11 |
| 4,459,825 | 7/1984 | Crouch | 62/404 |
| 4,566,282 | 1/1986 | Knoblauch et al. | 62/48 |
| 4,630,038 | 12/1986 | Jordan | 340/632 |
| 4,704,607 | 11/1987 | Teather et al. | 340/825.07 |
| 4,716,739 | 1/1988 | Harris et al. | 62/78 |
| 4,779,446 | 10/1988 | Rowland . | |
| 4,817,391 | 4/1989 | Roe et al. | 62/17 |
| 4,829,774 | 5/1989 | Wassibauer et al. | 62/78 |
| 4,833,892 | 5/1989 | Wassibauer et al. | 62/78 |
| 4,880,441 | 11/1989 | Kesting et al. | 55/16 |
| 4,894,997 | 1/1990 | Urushizaki et al. | 62/78 |
| 4,976,109 | 12/1990 | Garrett | 62/18 |
| 5,004,487 | 4/1991 | Kowalczyk | 55/269 |
| 5,060,505 | 10/1991 | Tury et al. . | |
| 5,063,753 | 11/1991 | Woodruff | 62/239 |
| 5,120,329 | 6/1992 | Sauer et al. | 55/16 |
| 5,125,237 | 6/1992 | Saia, III et al. | 62/239 |
| 5,127,233 | 7/1992 | Coffield | 62/78 |
| 5,156,009 | 10/1992 | Woodruff | 62/78 |
| 5,167,243 | 12/1992 | Cowan et al. | 131/290 |
| 5,332,547 | 7/1994 | Olson et al. | 422/3 |
| 5,333,394 | 8/1994 | Herdeman et al. | 34/467 |
| 5,355,781 | 10/1994 | Liston et al. | 99/476 |
| 5,437,837 | 8/1995 | Olson et al. | 422/3 |
| 5,457,963 | 10/1995 | Cahill-O'Brien et al. | 62/78 |

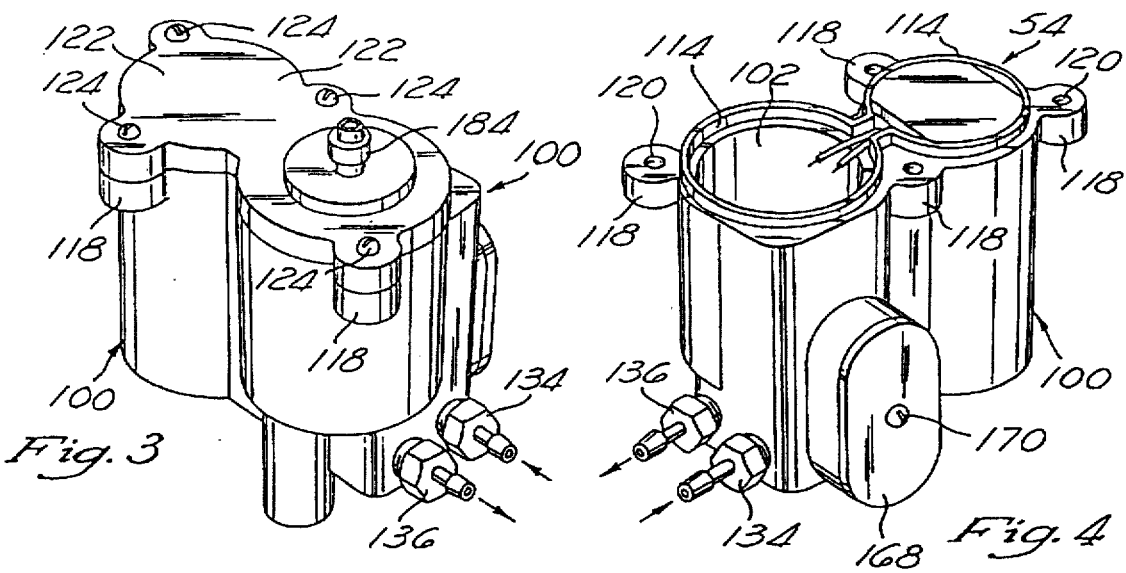
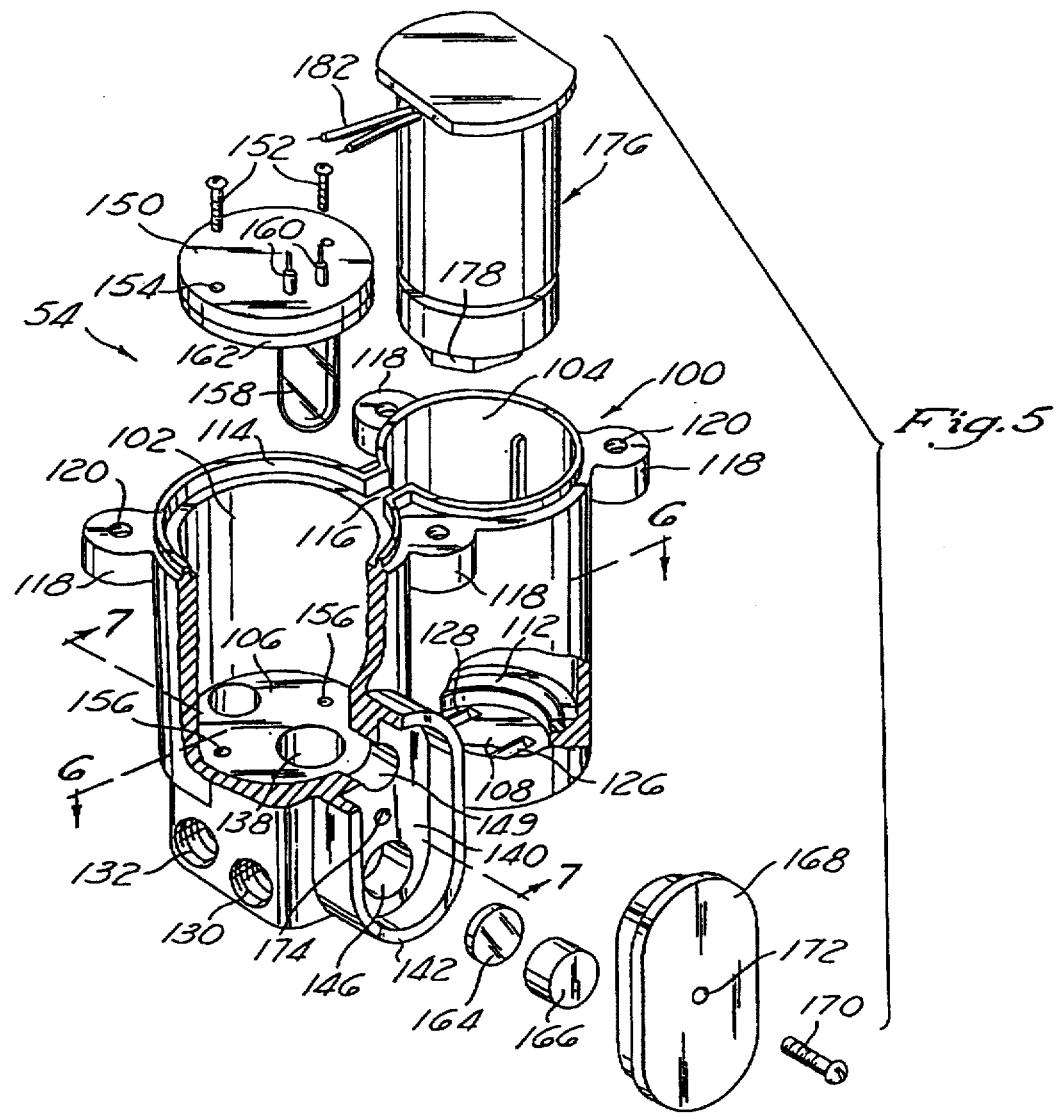

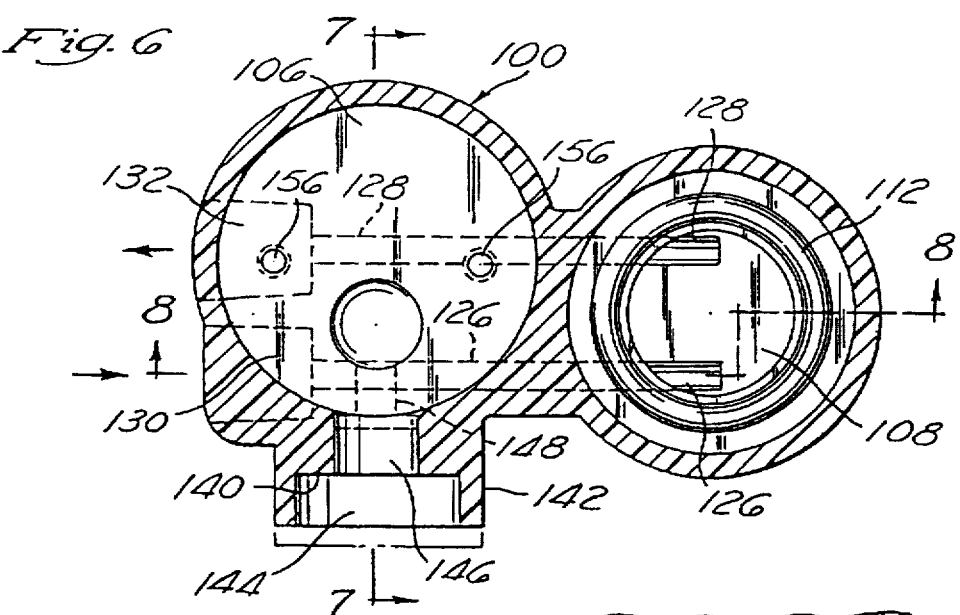
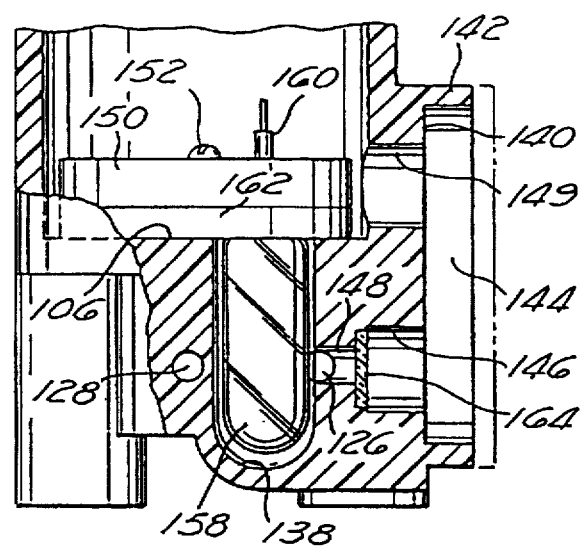
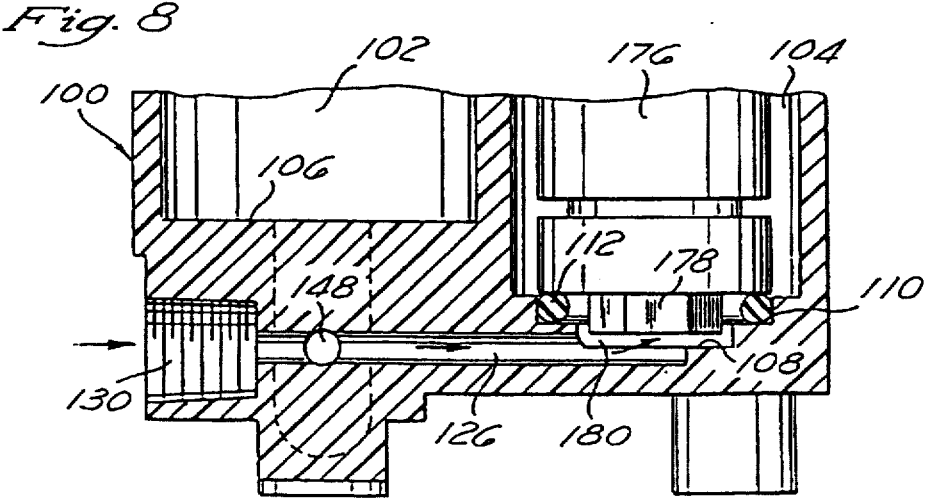

OXYGEN/CARBON DIOXIDE SENSOR AND CONTROLLER FOR A REFRIGERATED CONTROLLED ATMOSPHERE SHIPPING CONTAINER

RELATED APPLICATIONS

The present application is a continuation application of Ser. No. 08/603,863, filed Feb. 22, 1996, now abandoned, which is a continuation application of Ser. No. 08/374,876, filed Jan. 19, 1995, now U.S. Pat. No. 5,623,105, which is a continuation application of Ser. No. 08/113,428, filed Aug. 26, 1993, now abandoned, which is a divisional application of Ser. No. 07/964,937, filed Oct. 21, 1992, now abandoned.

FIELD OF THE INVENTION

The present invention relates generally to the production of controlled atmosphere environments, and more particularly to a device used for the control of oxygen and carbon dioxide levels within refrigerated shipping containers used for the transportation of perishable foods such as fruits, produce, meats or grain.

BACKGROUND OF THE INVENTION

The broad concept of utilizing controlled environments to promote storage life of perishable commodities such as fruits, meats, produce and grains is well known. Though the use of refrigeration units has been a common technique of preserving perishable goods, certain types of controlled atmosphere systems have recently been introduced which operate through the controlled manipulation of carbon dioxide and oxygen levels within transport/shipping containers in addition to the use of refrigeration. In this respect, hollow fiber permeable membranes are used for air separation in maintaining controlled carbon dioxide and oxygen levels within grain elevators and controlled atmosphere warehouses. As with most controlled atmosphere systems, those utilizing permeable membranes require a reliable source of compressed air. Typically, a compressor is used to provide a source of compressed air for the controlled atmosphere system. Additionally, since it is desirable to monitor the carbon dioxide and oxygen levels of the controlled atmosphere system, such systems typically include a sampling pump which is used to draw conditioned air from the transport/shipping container into carbon dioxide and oxygen sensing devices.

Recent advances in membrane technology have increased the efficiency and decreased the size of gas-permeable membrane systems thereby making the application of membrane technology more feasible for controlled atmosphere transport applications. However, though the technology associated with permeable membranes has advanced, transport refrigeration units typically do not include controlled atmosphere devices because of the reduced cargo space, increased weight, power and cost. Additionally, the corrosive marine environments and extreme temperature parameters typically encountered by mobile transport containers makes controlled atmosphere applications in conjunction with such containers very difficult.

One example of a prior art apparatus for producing a controlled atmosphere utilizing permeable membranes is disclosed in U.S. Pat. No. 4,187,391 issued to ROE. As disclosed therein, the ROE apparatus requires the use of a controller of high reliability. Existing prior art controllers have proven to be inadequate for such purposes because of the instability and reliability of the gas analysis components. Further, sampling pumps typically utilized to produce the necessary gas flow for these analyzers have also proven inadequate and expensive. Further, a processor employing complex logic to assign priorities to satisfy control parameters detect failure of the sensing components and default to a safe best mode operating condition under varying circumstances is required to insure produce life within the container. For mobile transport applications an additional problem encountered in shipping is that only limited electrical power is typically available for operating the system. The present invention specifically overcomes these and other deficiencies associated with prior art controlled atmospheric systems.

SUMMARY OF THE INVENTION

In accordance with the preferred embodiment of the present invention, there is provided a controller for a system for maintaining a controlled atmosphere within a sealed container. The system generally comprises a compressor to produce compressed gas and a membrane having different gas diffusion rates for separating the gas into its components. The controller comprises an analyzer for carbon dioxide (CO2) analysis, an analyzer for oxygen (O2) analysis, a means to calibrate these analyzers, and a means to circulate sample gases and calibrant gases through these analyzers. In the preferred embodiment the controller also has multiple inputs for sensing the temperature of the gas entering the membrane, for determining when the refrigeration system of the shipping container is operating at reduced power and for determining when the refrigeration system of the container is in a defrost cycle. The controller employs a microprocessor to control the temperature of the membrane input gas, a bypass valve for the membrane to control the amount of oxygen and carbon dioxide gas entering into the container, a valve to introduce carbon dioxide to the refrigerated chamber of the container and also control the CO2 level therein and a solenoid valve to periodically introduce calibrant gases to the analyzers.

ANALYZER PORTION OF THE CONTROLLER

The 170 degree Fahrenheit temperatures typically produced by the combined sun load, compressors, and other machinery in the space available outside the refrigerated chamber of the shipping container produce permanent damage to conventional preferred electrochemical analyzers. These analyzers also suffer from a 3% per degree Celsius temperature coefficient. It is therefore desirable to locate the analyzer sensor in the refrigerated chamber of the container. The refrigerated cargo space of the container however, is undesirable because of problems of mechanical damage to the analyzer sensor and that the cargo is typically designed to fill this space fully. A preferred space candidate therefor comprises the circulating fan ducting of the refrigerated container. However, this space is extremely limited. It also has the problem that high pressure water streams are periodically employed to clean and sterilize this area.

The present invention overcomes these problems by designing a combined carbon dioxide and oxygen sensor that is very compact and low cost. This enables a sealed oxygen-carbon dioxide sensor assembly that is small enough to fit in the available ducting space.

A typical prior art infrared analyzer consists of a source, means for pulsating the source so that the infrared energy from the source can be distinguished from background energy, a sample cell to contain the unknown gas sample, a means for selecting the wavelength to the area where the analyte has high absorption, and a detector to convert the infrared energy to an electrical signal. The source typically consists of an electrically heated element, in combination with a motor driven shutter to develop the pulsating infrared energy. An alternate prior art infrared source consists of an evacuated chamber with a low thermal mass electrically heated element and a window capable of transmitting the desired wavelengths. This window is typically made of sapphire. For the particular field of use of the present invention such prior art, motor driven source is too bulky and such prior art sapphire window evacuated source proves too expensive. Since the response time of the CO2 analyzer can be relatively slow, it was discovered in the present invention that a commercial available light bulb could be used to develop the pulsating energy if it is chopped at extremely low frequencies (less than 2 cycles per second). The majority of the radiation with the source of the present invention is produced by the emission of the glass envelope. The sensor of the present invention does not employ a sample cell in the classical sense, but the entire optical path between the light bulb and the detector is purged with the gas sample. In order to obtain reasonable life from the tungsten light bulb infrared source it is necessary to employ current regulation of the energizing energy in order to prevent the high initial current surge on turn-on. The light bulbs suitable for this application are similar to those used in flash lights and are less than 10 watts. Since the sensor is located in the refrigerated section of the container which is temperature controlled, the temperature coefficient problems associated with the sensors are greatly diminished.

SAMPLING SYSTEM

In order to draw sample and calibrant gases into the analyzer, a sample pump is typically employed in the prior art. These pumps have proven to be both expensive and unreliable. To overcome this problem the large circulating fans found in the refrigerated chamber are employed in the present invention to provide the suction needed to draw gas samples and calibrants into the analyzer. By placing a sampling conduit within the air stream of the refrigeration systems circulation fan sufficient suction is obtained. Where necessary a venturi or Pitot tube can be employed to magnify this suction. The circulating fan is deenergized during the defrost cycle. For this reason it is necessary for the microprocessor system to lock the controls and concentration display during this cycle and indicate that the readings are not current.

CALIBRATION SYSTEM

Oxygen and carbon dioxide analyzers require periodic calibration with gases of known concentration. In the application of use of the present invention, it is critical that the analyzers be accurate and functional for prolonged duration. The types and construction of the analyzers employed in the present invention are selected to enable this calibration to be accomplished using outside air. In this regard, it is important to introduce calibrant gases not only for the purpose of recalibrating the analyzers but also to determine that they are functioning properly. Otherwise the produce stored in the container will spoil. The electrochemical oxygen sensor of the present invention operates by measuring the current produced by oxygen ions formed by the diffusion of oxygen across a membrane. The response is essentially a linear function of the percentage of oxygen in the sample cell. When the sensor fails or no oxygen is present, the output is zero. For this reason, a single point upscale calibration is adequate to determine the proper functioning of the oxygen sensor. Outside air which is typically 20.8% $O_2$ is sufficiently accurate for this purpose.

The carbon dioxide analyzer of the present invention is of the single beam type where the output signal drops to zero with no infrared energy and is a maximum with a nonabsorbing gas in the optical path. At a constant temperature and with a fixed wavelength selection, the shape of the concentration versus signal does not change with this type of analyzer. Therefore, a single point calibration employing a nonabsorbing gas is satisfactory. Since outside ambient air typically is less than 600 parts per million $CO_2$, ambient air can be employed for calibration and determining that the CO2 analyzer is functioning properly.

MICROPROCESSOR CONTROL SECTION

The microprocessor of the present invention has a complex program which conditions and operates system components pursuant to a priority hierarchy chosen to insure optimum produce storage and to determine when these controlled devices should operate in order to maintain precise O2 and CO2 levels in the refrigerated chamber.

In order to prevent overloading the limited power available in mobil shipping applications, the microprocessor prevents the atmospheric system from operating until the cool down cycle of the refrigeration system is complete and the refrigeration system is operating at reduced power.

In order to optimize the performance of the membrane, the microprocessor controls the temperature of the inlet gas to the membrane. To control the concentration of the atmosphere in the refrigerated container the microprocessor employs complex logic to decide when to operate the membrane bypass valve, the compressor and a CO2 solenoid valve. It also periodically introduces air to calibrate the analyzers and to verify their performance. In the event the microprocessor detects an error in the performance of the analyzers it automatically defaults to a safe operational mode to maintain approximately correct atmospheric control within the container.

More particularly, since some controlled parameters are more critical to the preservation of the produce than others, it is necessary for the controller of the present invention to give priority to the most critical parameters when a conflict exists. The refrigeration system is the most critical and is given preference when necessary to prevent exceeding the peak power permitted. The control of oxygen is second in priority, and the control of carbon dioxide is the least. When the carbon dioxide level in the container exceeds the maximum desired, it is necessary to dilute the same with nitrogen from the membrane system by opening the membrane bypass valve and turning on the compressor to produce a maximum carbon dioxide dilution rate. This, however, simultaneously introduces gas having higher oxygen concentration. If this action causes the oxygen level to exceed the maximum control concentration, the bypass valve is closed giving priority to controlling the O2 level. If the $CO_2$ level is lower than the minimum set point, the controller opens the valve to a source of compressed $CO_2$ thereby enriching the $CO_2$ level in the container until the $CO_2$ level requirements are satisfied.

When the oxygen level exceeds the maximum set point, the compressor is turned on and the bypass valve is closed to introduce gas into the chamber having very low oxygen content. When the oxygen level is lower than the minimum set point, the compressor is turned on and the bypass valve is opened to introduce gas into the chamber having an elevated oxygen content. When the oxygen level is within the set limits, the compressor is turned off unless needed for CO2 corrections.

In addition the microprocessor periodically operates a three-way valve to introduce outside air to the analyzer section. The microprocessor checks the signals received from the analyzer during calibration to determine if they are within the expected range. If they are not, the microprocessor goes into a default mode for the failed analyte. Otherwise, it recalibrates to the correct values for air. This procedure checks for correct analyzer and sampling performance. The oxygen sensor typically decreases its signal output with prolonged use. The microprocessor gives a warning, informing the operator that the sensor should be replaced before the next trio when its output drops below a programmed value. When a default mode is detected for the oxygen sensor, the compressor operates full time and the bypass valve is closed. This can produce an oxygen level lower than desired within the container, but the adverse effect on the produce is less severe than exposure to elevated oxygen levels.

When the $CO_2$ level is lower than the minimum set point, the microprocessor opens the $CO_2$ valve to introduce additional $CO_2$ into the chamber. When it exceeds the maximum set point, it takes the action described earlier. In the event the calibrant signal from the $CO_2$ analyzer indicates $CO_2$ analyzer failure, then the $CO_2$ valve is closed. Low values of CO2 are less damaging to the produce than elevated values.

In addition, the microprocessor periodically operates the valve on a water trap to empty it. The conventional microprocessor further controls the inlet temperature to the membrane via a thermistor. Upon failure of the temperature sensor, the microprocessor defaults to a heater cycle program typically required to maintain operational temperature control for the membrane.

BRIEF DESCRIPTION OF THE DRAWINGS

These, as well as other features of the present invention will become more apparent upon reference to the drawings wherein:

FIG. 3 is a left side perspective view of the combined carbon dioxide/oxygen sensor of the present invention;

FIG. 4 is a right side perspective view of the carbon dioxide/oxygen sensor of the present invention;

FIG. 5 is an exploded view of the sensor shown in FIG. 4;

FIG. 6 is a cross-sectional view taken along line 6—6 of FIG. 5;

FIG. 7 is a cross-sectional view taken along line 7—7 of FIG. 5; and

FIG. 8 is a cross-sectional view taken along line 8—8 of FIG. 6.

DETAILED DESCRIPTION OF THE PREFERRED EMBODIMENT

Figure 1:
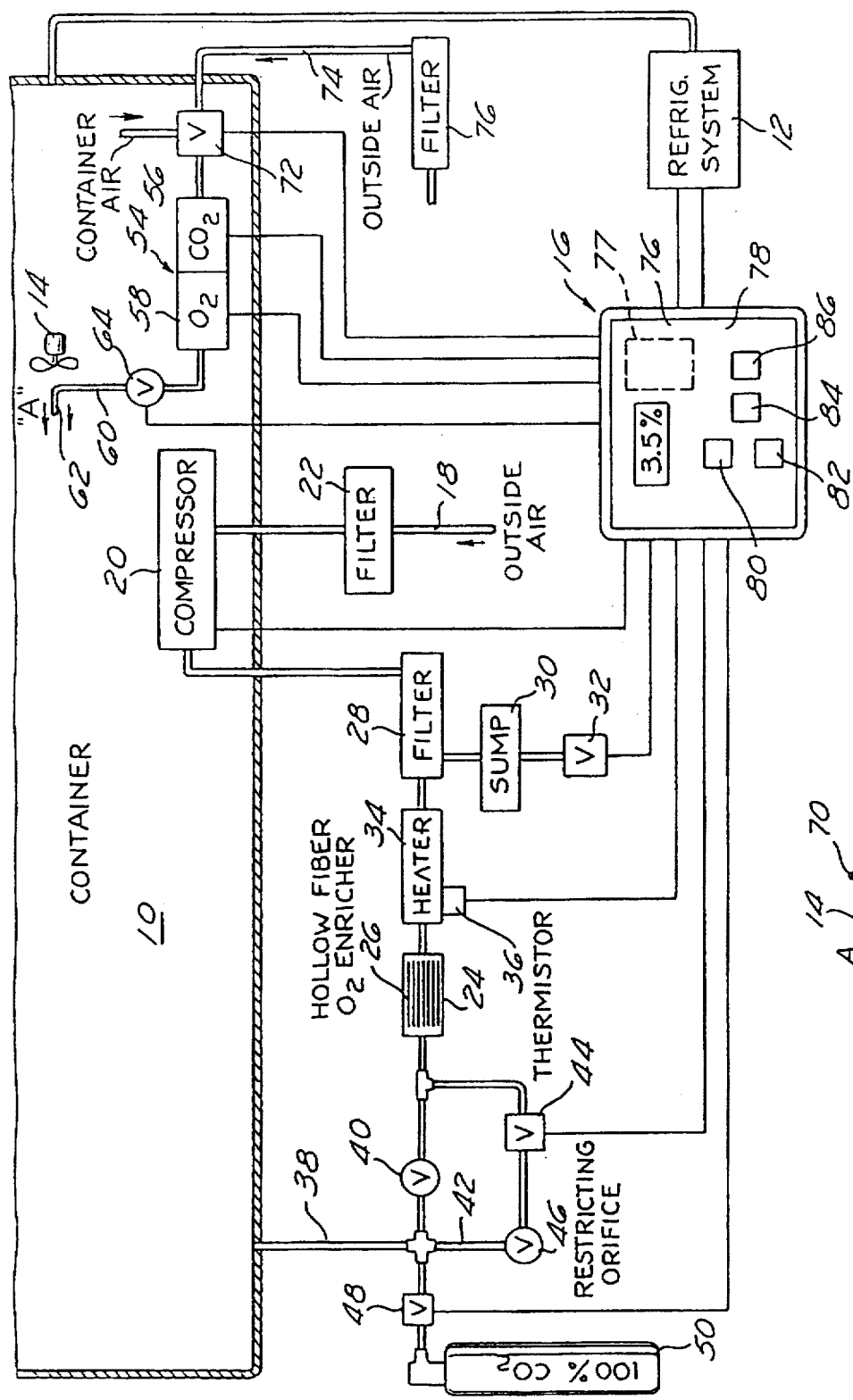
FIG. 1 is a schematic piping and control diagram of the present invention.

Referring now to the drawings wherein the showings are for purposes of illustrating a preferred embodiment of the present invention only, and not for purposes of limiting the same, FIG. 1 schematically illustrates a system for maintaining a controlled atmosphere within a sealed container 10.

In the preferred embodiment, container 10 is constructed in a manner so as to be substantially air-tight and is refrigerated via a conventional refrigeration system 12 which is fluidly coupled thereto. Additionally, disposed within the container 10 is at least one circulation fan 14 for the refrigeration system 12 which is typically disposed within the conventional air duct (not shown) of the container 10 and is used to maintain a uniform mixture of processed air within the container 10.

The controlled atmosphere system as interfaced to the container 10 comprises two independent gas flow paths. The first path is adapted to draw ambient air from outside the container 10 and, after processing of the same, subsequently introduce such processed air into the container 10. The second path is adapted to draw a quantity of the processed air from inside the container 10 for sampling and analyzer calibration purposes. Importantly, each of the two flow paths comprise components which are electrically interfaced to the controller 16 which is adapted to selectively activate and deactivate each of the two flow paths and to coordinate their operation.

AIR INLET SYSTEM STRUCTURE AND OPERATION

As depicted in FIG. 1, the flow path of the present invention which draws air from outside of the container 10 and subsequently introduces such air into container 10 generally comprises a first inlet 18 which is adapted to receive ambient air from outside of container 10. Preferably disposed within container 10 is an air compressor 20 which is electrically interfaced to controller 16 and includes an intake port fluidly coupled to the first inlet 18. When controller 16 activates compressor 20, ambient, i.e. outside air is drawn into the first inlet 18. Positioned between the first inlet 18 and compressor 20 is a first filter 22 which is operable to remove salt mist or other particulates from the air drawn into first inlet 18 before such air enters air compressor 20. Ambient air drawn into compressor 20 through its intake port is compressed to a typical value of approximately 100 PSI.

After the air is compressed by the compressor 20, the air is preferably communicated back outside of the container 10 and into a gas separation means 24 which includes an entrance port connected to the exhaust port of the compressor 20. In the preferred embodiment, the gas separation means 24 comprises a hollow fiber oxygen enricher which includes a plurality of hollow fiber permeable membranes 26 disposed therein. Importantly, when compressed air enters the bores of the hollow fiber permeable membranes 26, fast traveling gases such as oxygen and carbon dioxide as well as water are able to permeate through the walls of the membranes 26 at a faster rate than slower traveling gases such as nitrogen. Thus, as will be recognized, the rate at which air passes through the membranes 26 determines the volume and purity of the nitrogen which is produced by and exits through the exit port of the gas separation means 24. The permeable membranes 26 utilized in conjunction with the present invention are manufactured by Permea, Inc. and are more thoroughly disclosed in U.S. Pat. No. 4,880,441 issued to Kesting et al., the disclosure of which is expressly incorporated herein by reference.

Disposed between air compressor 20 and gas separation means 24 is a second filter 28. Second filter 28 is used to purify the air exhausting from compressor 20 to 3.0 microns and to remove water vapor therefrom. Connected to second filter 28 is a sump 30 which is used to collect water removed from the compressed air by the second filter 28. Additionally, connected to sump 30 is a first solenoid valve 32 which is electrically interfaced to controller 16. First solenoid valve 32 is interfaced to a drain (not shown) disposed within sump 30 and is periodically activated by controller 16 to drain water which has accumulated within the sump 30. Disposed between the second filter 28 and gas separation means 24 is a heater 34 which is also electrically interfaced to controller 16. Heater 34 is operable to heat the compressed air to a temperature set point of approximately 50 degrees Celsius before such air enters gas separation means 24. Attached to the heater 34 is a thermistor 36 which is also electrically interfaced to controller 16 and operable to sense the air temperature and send an air temperature signal to the controller 16.

Connected to the exit port of the gas separation means 24 is a first outlet 38. First outlet 38 is used to place the exit port of the gas separation means 24 in fluid communication with processed air inside the container 10. Connected to the first outlet 38 is a first valve 40 which is used to regulate the flow of air through gas separation means 24. Also connected to the first outlet 38 is a bypass channel 42 incorporating a second solenoid valve 44 which is electrically interfaced to the controller 16, and a restricting orifice 46. As seen in FIG. 1, bypass channel 42 is interfaced to first outlet 38 in a manner whereby bypass channel 42 is operable to form a flow path between gas separation means 24 and container 10 which does not include the first valve 40. As such, when the second solenoid valve 44 is not activated, gas which exits gas separation means 24 and flows into first outlet 38, flows only through first valve 40 before entering container 10. When second solenoid valve 44 is activated, gas exiting gas separation means 24 flows through two separate flow paths. The first path is the same as previously described wherein the gas enters first outlet 38 and flows through first valve 40 before entering container 10. In the second path, after gas enters first outlet 38, the gas flows into bypass channel 42, through restricting orifice 46, and back into first outlet 38 before entering container 10. As can be appreciated, when second solenoid valve 44 is activated, the flow of air through gas separation means 24 is increased. In contrast, when second solenoid valve 44 is not activated, the flow of air through gas separation means 24 will be relatively slow since all of the air channeled into first outlet 38 must pass through first valve 40. In those instances when the flow rate of air through gas separation means 24 is slow, greater amounts of oxygen and carbon dioxide are allowed to permeate through permeable membranes 26, thereby causing a gas which is very low in oxygen and carbon dioxide content to be introduced into the container 10 via first outlet 38. When second solenoid valve 44 is opened, the flow rate of air through gas separation means 24 significantly increases, since in addition to traveling through first valve 40, gas exiting gas separation means 24 also travels through bypass channel 42, and restricting orifice 46. As such, the increased flow rate through gas separation means 24 causes less oxygen to be removed from the air, thereby causing gas having increased oxygen levels to be introduced into the container 10. Thus, by manipulating the first valve 40 and the second solenoid valve 44 in a desired manner, two different flow rates through gas separation means 24 may be achieved, thereby allowing gas having increased or decreased concentrations of oxygen to be introduced into the container 10. Additionally, those skilled in the art will recognize that the bypass channel can alternatively be arranged to increase air flow into the container directly from filter 28 thereby bypassing the membranes 26.

Also fluidly coupled to first outlet 38 is a third solenoid valve 48 which is electrically interfaced to controller 16. Connected to third solenoid valve 48 is a tank 50 containing pure carbon dioxide. When third solenoid valve 48 is actuated by the controller 16 to an open position, pure carbon dioxide is allowed to pass from the tank 50 into the first outlet 38 and subsequently into the container 10.

GAS SAMPLING SYSTEM STRUCTURE AND OPERATION

The second flow path of the present invention consists of a sampling system which is used to monitor the oxygen and carbon dioxide levels of gas within the refrigerated container 10. Disposed within the contained 10 is a sample inlet 52 which is adapted to receive gas samples from therewithin. Fluidly coupled to one end of the sample inlet 52 is a gas analyzing means 54 which is also disposed directly within the container 10 and is used for sensing the oxygen and carbon dioxide levels of gas within the container 10. As will be described in more detail, in the preferred embodiment, the gas analyzing means 54 incorporates a combined carbon dioxide sensor 56 and an oxygen sensor 58 which are arranged in a series flow path. In the preferred embodiment, the carbon dioxide sensor 56 comprises an infrared sensor, while the oxygen sensor 58 comprises an electrochemical transducer. Since high temperatures or extreme temperature fluctuations adversely affect the performance of the carbon dioxide and oxygen sensors 56, 58, disposing the gas analyzing means 54 within the interior of the refrigerated container 10 subjects the sensors 56, 58 to constant temperatures when operating, thus enhancing the performance thereof. Additionally, the gas analyzing means 54 is fabricated so as to be liquid and vapor tight thus protecting the carbon dioxide and oxygen sensors 56, 58 therewithin from exposure to fungicides, cleansers or other agents which are typically and periodically applied to the interior of the refrigerated container 10 under high pressure for purposes of removing bacteria, spores and other elements from the walls thereof.

Figure 2:
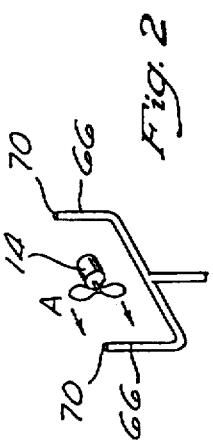
FIG. 2 is a perspective view of an alternative embodiment of the vacuum delivery means used in the present invention.

The second air flow path of the present invention further comprises a suction or vacuum delivery means which is disposed within the container 10 and is fluidly coupled to the gas analyzing means 54 for selectively drawing a gas sample through the sample inlet 52 and the gas analyzing means 54. In the preferred embodiment, the delivery means comprises a tube 60 having a first end fluidly coupled to the gas analyzing means 54 and a second end located to be disposed within the air stream A of the circulation fan 14 disposed within the container 10. The tube 60 may comprise a conventional pitot tube (shown in FIG. 1) a pair of pair of tubes 68 (illustrated in FIG. 2) or a venturi tube arrangement (not shown) when increased suction is desired. As will be recognized, the passage of the air stream A over the second end of the tube 60 or tubes 66 when the circulation fan 14 is energized causes a vacuum to be pulled within the tube 60 or tubes 66 thus drawing a gas sample from the container 10 into the gas analyzing means 54 via the sample inlet 52. The vacuum delivery means further includes a control valve 64 which is fluidly coupled between the first end of the tube 60 and the gas analyzing means 54 and is electrically interfaced to the controller 16. In the preferred embodiment, the control valve 64 is selectively actuatable between open and closed positions by the controller 16 and is used for purposes which will be described below. As will be recognized, the gas sample, after being drawn through the gas analyzing means 54 and control valve 64, is reintroduced into the interior of the container 10 via the open distal tips 62 of the tube 60 or pair of tubes 66.

Advantageously, the use of the tube 60 or tubes 66 disposed within the circulation fan airstream eliminates the necessity of having to use small sample pumps in the sampling system which, as previously indicated, are known to be unreliable and have relatively short life spans, particularly when exteriorally mounted and employed in salt water environments. In the present invention, the circulation fan 14, when energized, produces high velocity air flow within the container 10 in the range of 400 to 500 CFM. As such, the placement of the second end of the tube 60 or tubes 66 in the direct flow of air above or below the fan blade of the circulation fan 14 produces reliable suction required to draw the gas sample from within the interior of the container 10 into the gas analyzing means 54 via the sample inlet 52.

CALIBRATION PROCEDURE

In the present invention, both the carbon dioxide sensor 56 and oxygen sensor 58 of the gas analyzing means 54 utilize periodic calibration to insure accuracy and proper operation of the sensors. In the preferred embodiment of the present invention, outside, ambient air is employed for calibration. The use of ambient air for calibration purposes is extremely advantageous since standardized calibrant gas supplies are costly and/or unavailable in remote geographic locations, and also oftentimes possess varying purity levels. Fluidly coupled within the sample inlet 52 is a fourth solenoid valve 72 which is electrically interfaced to the controller 16 and selectively actuatable between first and second positions. Extending through the wall of the container 10 is an ambient air inlet 74 having a first end fluidly coupled to the fourth solenoid valve 72 and a second end which is disposed outside of the container 10. In the preferred embodiment, the fourth solenoid valve 72 is adapted to create an open passage between the sample inlet 52 and gas analyzing means 54 when in the first position and an open passage between the ambient air inlet 74 and gas analyzing means 54 when in the second position. During the air calibration procedure, actuation of the fourth solenoid valve 72 to the second position by the controller 16 which occurs only when the circulation fan 14 is energized and the opening of the control valve 64 causes ambient air to be drawn into the ambient air inlet 74 and through the gas analyzing means 54. Thereafter, the ambient air flows through the control valve 64 and pitot tube 60 or tubes 66 and subsequently into the interior of the container 10. Disposed within the ambient air inlet 74 on the outside of the container 10 is a third filter 76 which is operable to remove any contaminants from the ambient air entering the ambient air inlet 74 before such air is able to pass through the fourth solenoid valve 72 and into the gas analyzing means 54. Importantly, the introduction of the relatively small amounts of ambient air which are needed for the calibration procedure into the interior of the container 10 does not degrade the controlled atmosphere established therewithin.

The sampling of gas within the interior of the container 10 and the calibration of the gas analyzing means 54 with ambient air from outside of the container 10 is conducted automatically by the controller 16. In the preferred embodiment, measurements of the oxygen and carbon dioxide levels within the container 10 are continuously taken via actuation by the controller 16 of the fourth solenoid valve 72 to the first position and the actuation of the control valve 64 to the open position. As previously indicated, the sampling procedure only occurs when the circulation fan 14 is energized since the air stream A created thereby is needed to create a vacuum within the tube 60 or tubes 66.

The air calibration procedure is conducted by the controller 16 via the actuation of the fourth solenoid valve 72 to the second position and the actuation of the control valve 64 to the open position. Additionally, as previously explained with respect to the air sampling procedure, the circulation fan 14 must also be energized so as to create a vacuum within the tube 60 or tubes 66 to cause ambient air to be drawn into the gas analyzing means 54 via the ambient air inlet 74. In the preferred embodiment, the air calibration procedure is performed automatically by the controller 16 approximately once per hour or manually as desired by activation of the calibration switch control button 86 located on the housing of the controller 16.

After allowing time for the carbon dioxide sensor 56 and oxygen sensor 58 to be thoroughly purged with ambient air, the controller 16 assumes a proper baseline reading for the sensors to be 0.05 percent carbon dioxide and 20.8 percent oxygen. These readings are used as baseline settings for the next hour or similarly desired period. Importantly, the assumed carbon dioxide and oxygen levels coincide with the oxygen and carbon dioxide levels typically found in ambient air. Since both the air calibration procedure and gas sampling procedure require the circulation fan to be energized, the controller 16 is programmed to actuate the control valve 64 to the open position only when the circulation fan 14 is operating. Additionally, the controller 16 is programmed to only energize the compressor 20 when the refrigeration system 12 is at a reduced load. Thus, in the present system, the refrigeration system 12 never operates at full capacity concurrently with compressor 20, nor do the air calibration or gas sampling procedures occur when the refrigeration system 12 is operating under full load conditions. As such, the peak electrical load requirements of the controlled atmosphere system of the present invention are greatly reduced.

As previously specified, during the air calibration procedure the gas analyzing means 54 is calibrated based on the expected oxygen and carbon dioxide concentrations of ambient air passing therethrough. In the preferred embodiment the controller 16 is adapted to generate an alarm if, during the calibration procedure, the carbon dioxide and oxygen sensors 56, 58 signals are outside expected parameters. When such an alarm is generated by the controller 16, the control settings of the sensors 56, 58 are caused by the controller 16 to automatically default to predetermined control settings that approximate desired operational settings. The controller 16 is also programmed to allow the gas analyzing means 54 to be completely purged with ambient air prior to conducting a calibration procedure and to determine whether such purging has occurred by taking multiple readings of the oxygen and carbon dioxide levels of the air which are separated in time.

In this respect, the controller 16 preferably stores such readings and determines whether the differences between consecutive readings are within accepted parameters. This comparison between consecutive readings additionally facilitates correction for signal inaccuracies caused by intermittent noise and/or power surges encountered in the electrical power system for the container. In the preferred embodiment, plural consecutive readings such as five consecutive readings are reviewed by the microprocessor and compared with the preceeding signal reading to determine any trend or drift between the readings. If the trend or drift is within specified parameters, then the average signal readings or last signal reading is utilized and displayed by the microprocessor. Alternatively, if the trend or drift is outside of specified parameters, for instance if a noise spike is present on one of the consecutive readings, then the noise spike is replaced with a subsequent signal reading and is thereby ignored by the microprocessor for display and control purposes. As such inaccuracies caused by intermitten power spikes and noise is eliminated in the present invention.

CONTROLLER STRUCTURE AND OPERATION

In the preferred embodiment of the present invention, the controller 16 preferably comprises a housing 76 having a conventional processor such as a microprocessor 77 disposed therein. The microprocessor 77 is electrically interfaced to the following devices which serve as inputs to the microprocessors: namely the container refrigeration system 12 for recognizing both defrost and reduced load signals, the thermistor 36; the analyzing means 54 and thus the carbon dioxide sensor 56 and oxygen sensor 58 and the plural control switch buttons 80, 82, 84 and 86 as described infra. Additionally the microprocessor 77 is electrically interfaced to the following device which serve as outputs for the microprocessosr 77 namely the air compressor 20; first solenoid valve 32; heater 34; second solenoid valve 44; third solenoid valve 48; fourth solenoid valve 72; control valve 64 and the display and storage 78.

As shown in FIG. 1, display panel 78 as well as the four function control buttons 80, 82, 84 and 86 are disposed upon the front of the housing 76. More particularly, these function control buttons comprise an "UP" button 80, a "DOWN" button 82, a "SET" button 84 and a "FUNCTION" button 86. The UP button 80 and the DOWN button 82 are used to adjust values or trigger events which are displayed on display panel 78 through the use of the SET button 84 and the FUNCTION button 86. The SET button 84 scrolls through choices that let the user set the following list of values:

| ITEM | RANGE | DEFAULT |
| --- | --- | --- |
| Membrane Gas Input Temperature | (40–60° C.) | 50° C. |
| Oxygen Set Point | (0.0–20.0%) | 5.0% Oxygen |
| Oxygen Hysteresis | (0.1–1.0%) | 1.0% Oxygen |
| Carbon Dioxide Set Point | (0.0–20.0%) | 5.0% Carbon Dioxide |
| Carbon Dioxide Hysteresis | (0.1–1.0%) | 1.0% Carbon Dioxide |

The FUNCTION button 86 also allows the user to manually initiate a calibration cycle. The user can also display on display panel 78 the total compressor on time, and by using a combination of the aforementioned buttons, clear the total time. The total compressor on time is displayed on display panel 78 in hours with the maximum value being 4660 hours. If the maximum is exceeded, the count changes to the word "OVERFLOW" on the display panel 78 until the count is cleared back to zero.

CONTROL LOGIC AND SYSTEM OPERATION

Referring now to FIG. 1, during system operation, the oxygen level within container 10 is typically maintained at a level of two (2) to five (5) percent while the carbon dioxide level is typically maintained at a level of one (1) to ten (10) percent depending on the type of produce, meat or other perishable commodity being stored within the refrigerated container 10. The remainder of the gas within the container 10 preferably comprises nitrogen and water vapor. In the initial phases of operation, the carbon dioxide sensor 56 and oxygen sensor 58 of the gas analyzing means 54 are calibrated using the air calibration procedure in the manner previously described. These calibration values are then stored within the microprocessor of the con-roller 16 and subsequently used for comparison purposes of sensor signals obtained during continuous gas sampling.

During operation of the refrigeration circulating fan, the microprocessor within the controller 16 causes a gas sample to be drawn into the gas analyzing means 54 in a manner previously described, to allow measurements of the carbon dioxide and oxygen levels within the container 10 to be taken by the oxygen and carbon dioxide sensors 56, 58. The controller 16 evaluates the signals generated by the gas analyzing means 54 in a manner previously described and determines whether such levels are too low or too high relative desired oxygen and carbon dioxide level set points or bands. If desired, such oxygen and carbon dioxide measurement may be optionally dumped to a RAM memory board with a back up memory controlled by the microprocessor. The oxygen and carbon dioxide set point levels are typically two percent and five percent, respectively, as inputted into the microprocessor by the function control buttons, though it will be appreciated that other oxygen and carbon dioxide set points may be programmed into the microprocessor as different commodities have different requirements. Additionally, as previously specified, the acceptable oxygen and carbon dioxide bands are typically two to five percent and one to ten percent, respectively.

Oxygen Level High

In response to a determination from the oxygen sensor 58 that the oxygen level within the container 10 exceeds a predetermined oxygen range, i.e. exceeding the two percent set point or not within the acceptable band, the microprocessor within the controller 16 responds by switching on the air compressor 20, and heater 34. Controller 16 will also maintain second solenoid valve 44 in the OFF position. Due to the activation of the air compressor 20, air will be drawn from outside of the container 10 into the first inlet 18, and will subsequently pass into gas separation means 24. Since second solenoid valve 44 is not activated, gas exiting gas separation means 24 into the first outlet 38 will pass only through first valve 40 before entering the container 10. For the reasons previously discussed, this particular flow path causes reduced flow through gas separation means 24, thereby permitting greater quantities of oxygen to be removed from the air passing through the permeable membranes 26. As such, gas entering container 10 through first outlet 38 has a greatly reduced oxygen level which therefore reduces the oxygen content within the container 10.

Oxygen Level Low

In response to a determination from the oxygen sensor 58 that the oxygen level within the container 10 is below a predetermined oxygen range, i.e. less than two percent, the microprocessor within the controller 16 will once again actuate operation of the air compressor 20 and will likewise activate the heater 34. Additionally, the controller 16 will also turn the second solenoid valve 44 to the ON position. Once activated, air compressor 20 will draw ambient air into first inlet 18 and channel such air into gas separation means 24. However, since second solenoid valve 44 is now activated, gas exiting gas separation means 24 into the first outlet 38 will pass through restricting orifice 46 in addition to the first valve 40. Thus, as previously discussed and described, through the activation of second solenoid valve 44, the flow through gas separation means 24 will be greatly increased. Due to this increased flow, less oxygen will be removed from the air by permeable membranes 26. Thus, the oxygen content of gas entering container 10 via first outlet 38 is increased, thereby increasing the oxygen levels within the container 10.

Carbon Dioxide Level High

In response to a determination from the carbon dioxide sensor 56 that the carbon dioxide level within the container 10 exceeds a predetermined carbon dioxide range, i.e. exceeding five percent or not within the acceptable band, the system will function in exactly the same manner as previously discussed with respect to the determination that the oxygen level within container 10 exceeds a predetermined oxygen range, thereby diluting the CO2 level within the container. This operating condition will continue to exist until such time as the oxygen level within the container exceeds its maximum limit.

Carbon Dioxide Level Low

In response to a determination from the carbon dioxide sensor 56 that the carbon dioxide level within the container is below a predetermined carbon dioxide range, i.e. less than five percent, the microprocessor within the controller 16 will cause the third solenoid valve 48 to actuate to the open position which allows pure carbon dioxide to pass from the tank 50 through first outlet 38 and into the container 10, thereby raising the carbon dioxide levels within container 10.

In the preferred control logic of the present invention, the microprocessor is programmed with a time-based lock-out that prevents the compressor 20 from being "short-cycled." Thus, the compressor 20 will always be kept off for a minimum time of three minutes, even if the control logic attempts to cause compressor activation to occur. Additionally, the temperature control facilitated by the thermistor 36 is interlocked with the control of the compressor 20. Thus, preferably no heating of the air will take place when the compressor 20 is not operating. It is also contemplated that hardware circuitry may be utilized in conjunction with the present system that will detect a failed temperature sensor. If this condition occurs, the heater 34 will run at a fixed duty cycle in an attempt to maintain a useful system temperature. An additional interlock may also be added to prevent the controlled atmosphere system of the present invention from operating until the refrigeration system 12 has brought the container 10 to a desired temperature operation. This prevents the present system from adding to the peak electrical power load. Such prevention is important since mobile installations have limited electrical power available.

GAS ANALYZING MEANS STRUCTURE AND OPERATION

Referring now to FIGS. 3–8, the preferred embodiment of the gas analyzing means 54 used in the present invention is depicted. The analyzing means generally comprises a housing 100 defining a first interior chamber 102 and a second interior chamber 104, each of which have generally cylindrical configurations. The first chamber 102 defines a bottom surface 106, while the second chamber 104 defines a bottom surface 108. As best seen in FIGS. 5 and 8, the second chamber 104 is formed to define an annular recess 110 in close proximity to the bottom surface 108 thereof into which is received an O-ring 112. Formed about the upper rims of the first and second chambers 102, 104, is a continuous flange 114 which includes an open channel 116 extending between the central portion thereof. Formed on and extending outwardly from the outer surface of the upper portion of the housing 100 are rounded extensions 118 which include threaded apertures 120 extending axially therethrough. Releasably attachable to the housing 100 is a lid member 122 which, as shown in FIG. 3, is formed in a manner such that when placed over the flange 114, fasteners such as screws 124 may be extended therethrough into the apertures 120 of extensions 118. When assembled, the lid member 122 forms a liquid and vapor tight seal against the housing 100, thus preventing any moisture from entering either the first chamber 102 or second chamber 104.

Formed within the housing 100 is a gas sample inlet passage 126 and a gas sample outlet passage 128, both of which are best seen in FIGS. 5 and 6. In the preferred embodiment, the first end of the inlet passage 126 opens into a threaded inlet aperture 130, while the second end of the inlet passage 126 opens into the bottom surface 108 of the second chamber 104. Similarly, the first end of the outlet passage 128 opens into the bottom surface 108 of the second chamber 104, while the second end opens into a threaded outlet aperture 132. As seen in FIGS. 3 and 4, threadably received into the inlet aperture 130 is an inlet fitting 134, while threadably received into the outlet aperture 132 is an outlet fitting 136. As will be recognized, gas samples enter the housing 100 via the inlet fitting 134 and flow through the inlet passage 126 into the lower portion of the second chamber 104. The sample gas then flows from the lower portion of the second chamber 104, into and through the outlet passage 128, with the gas sample eventually exiting the housing 100 via the outlet fitting 136.

An elongate cavity 138 is formed in the bottom surface 106 of the first chamber 102. As seen in FIGS. 6 and 7, cavity 138 is formed in the bottom surface 106 in an orientation wherein the cavity 138 communicates with a portion of the inlet passage 126 via an aperture disposed in the side surface thereof. Formed on the lower portion of the housing 100 is an elliptically shaped side surface 140 which is circumvented by a correspondingly shaped flange 142. The side surface 140 and flange 142 define a side chamber 144 which is formed in close proximity to the cavity 138 and partially overlaps the first chamber 102. Formed in the lower portion of the side surface 140 is an annular recess 146. Additionally, formed in the bottom of the annular recess 146 is a side aperture 148 which extends through the housing 100 and communicates with the inlet passage 126. In the preferred embodiment, the annular recess 146 is formed in the side surface 140 in an orientation such that the side aperture 148 formed in the bottom thereof will communicate with the inlet passage 126 and be in coaxial alignment with the aperture disposed in the side surface of the cavity 138. As such, the housing 100 of the gas analyzing means 54 is formed such that a continuous passage exists between the interior of the cavity 138 and annular recess 146 with such passage being bisected by the inlet passage 126. Disposed in the upper portion of the side surface 140 is an upper aperture 149 which extends through the housing 100 and communicates with the lower portion of the first chamber 102. In this respect, the upper aperture 149 forms an open passage between the side chamber 144 and the first chamber 102.

Releasably attachable to the bottom surface 106 of the first chamber 102 is an annular socket plate 150. In the preferred embodiment, the attachment of the socket plate 150 to the bottom surface 106 is facilitated by a pair of fasteners such as screws 152 which are extended through a pair of apertures 154 disposed within the socket plate 150 and subsequently received into a corresponding pair of threaded apertures 156 disposed within the bottom surface 106 of the first chamber 102. Attached to the lower surface of the socket plate 150 is an infrared light source 158. In the preferred embodiment, the light source 158 consists of an incandescent light, and more particularly, a GILWAY L6402 bulb. The light source 158 is attached to the lower surface of the socket plate 150 such that the electrical leads 160 thereof extend upwardly through the socket plate 150 in the manner shown in FIGS. 5 and 7. Additionally, the light source 158 is attached to the lower surface in an orientation wherein the light source 158 will be received within the cavity 138 when the socket plate 150 is attached to the bottom surface 106, in the manner shown in FIG. 7. In this respect, the cavity 138 is sized so as to define an open cavity about the entire outer surface of the light source 158 when such is received thereinto. In the preferred embodiment, an annular rubber seal 162 having a size approximately equal to the size of the socket plate 150 is disposed between the socket plate 150 and the bottom surface 106 of the first chamber 102. The tightening of the screws 152 causes the rubber seal 162 to be compressed between the socket plate 150 and the bottom surface 106.

Disposed within the annular recess 146 is an optical filter 164. As best seen in FIG. 7, the optical filter 164, when placed within the annular recess 146, resides on the shoulder defined by the intersection of the recess 146 and the side aperture 148. Also disposed within the annular recess 146 is a pyroelectric infrared sensor 166. In the preferred embodiment, the infrared sensor 166 is sized such that when fully received into the annular recess 146, the top surface thereof will be substantially flush with the side surface 140. As will be recognized, when the optical filter 164 and infrared sensor 166 are disposed within the recess 146, the filter 164 will completely shield the sensor 166 from the side aperture 148. To protect the infrared sensor 166 from the derogatory effects of any fungicides or other cleansers sprayed into the interior of the container 10, a cover 168 is releasably attached to the elliptical flange 142 via a fastener 170 which is extended through an aperture 172 disposed within the cover 168 and received into a threaded aperture 174 disposed within the central portion of the side surface 140. Though not shown, when the cover 168 is engaged to the flange 142, the electrical lead wires extending from the sensor 166 extend through the enclosed side chamber 144 and into the first chamber 102 via the upper aperture 149.

Disposed within the second chamber 104 is an oxygen sensor 176. As seen in FIGS. 5 and 8, the oxygen sensor 176 includes a gas inlet 178 formed on an extending downwardly from the bottom surface thereof. In the preferred embodiment, the oxygen sensor 176 is disposed within the second chamber 104 in a manner wherein the O-ring 112 is firmly compressed between the annular recess 110 and the bottom surface of the oxygen sensor 176. When the oxygen sensor 176 is disposed within the second chamber 104 in this manner, an annular circulation space or chamber 180 is defined between the gas inlet 178 of the oxygen sensor 176 and the bottom surface 108 of the second chamber 104. As best seen in FIG. 8, the circulation chamber 180 is sealed via the compression of the O-ring 112 against the bottom surface of the oxygen sensor 176 which occurs when the lid member 122 is attached to the flange 114. Extending outwardly from the upper portion of the oxygen sensor 176 are its associated lead wires 182.

As best seen in FIG. 4, the oxygen sensor 176 is disposed within the second chamber 104 in a manner wherein the electrical lead wires 182 extend through the channel 116 defined by the flange 114 and into the first chamber 102. Advantageously, the inclusion of the channel 116 allows the wires 182 to pass into the first chamber 102 though the lid member 122 which is rigidly attached to and sealed against the flange 114. Due to the inclusion of the electrical leads 162 of the light source 158 on the top surface of the socket plate 150, the extension of the wires of the sensor 166 through the upper aperture 149 and the extension of the wires 182 through the channel 116, the first chamber 102 may be used as an electrical lead junction box when the lid member 122 is attached to the housing 100. After the proper electrical connections are made within the first chamber 102, one or more wires may be extended through a single sealed cable 184 which is attached to the top surface of the lid member 122 in fluid-tight relation and is oriented over the first chamber 102 when the lid member 122 is attached to the housing 100. As such, due to the fluid-tight engagement of the lid member 122 to the housing 100, the fluid-tight engagement of the cover 168 to the flange 142, and the passage of all the electrical wires through the single sealed cable 184, the internal components on the gas analyzing device 54 are protected from exposure to any liquids or vapors which may have derogatory effects on such components when the interior of the refrigerated container 10 is cleaned.

As previously specified, the gas analyzing means 54 is used to measure the carbon dioxide and oxygen levels of gas samples from within the interior of the container 10. In operation, the pitot tube 60 or tubes 66 as previously described are fluidly connected to the outlet fitting 136, with the sample inlet 52 being fluidly connected to the inlet fitting 134. When suction is created by the pitot tube 60 or tubes 66, the gas sample is pulled into the sample inlet 52 and introduced into the inlet passage 126 via the inlet fitting 134. The gas sample flows through the inlet passage 126 and past the passageway defined by the side aperture 148 and side wall aperture of the cavity 138. This passageway defines an optical path for the gas to be analyzed and as the gas sample passes therethrough, the radiation from source 158 passes through the gas, optical filter 164 and contacts the infrared sensor 166.

As is well known, infrared analyzers require a source of pulsing infrared energy generated at a wavelength which is absorbable by the gas being tested. The infrared energy must be pulsed in order to distinguish between the radiation produced by the source and the steady radiation produced by all surfaces at room temperature. Typically, with carbon dioxide analysis, the required wavelength of energy is approximately 4.3 microns. In the preferred embodiment of the present invention, the infrared source 158 is pulsed i.e. chopped at a rate of 0.5 seconds which provides a satisfactory frequency for the analysis of the carbon dioxide levels within the gas sample. The light source 158 includes a relatively thin electrically nonconducive glass or quartz outer sheath or envelope which is periodically heated and cooled by a tungsten filament disposed therein. Because glass and quartz do not pass infrared radiation, the infrared radiation is not produced by the heating of the tungsten filament therein. Rather, the infrared radiation is produced by the glass or quartz sheath itself when heated by the passage of current through the tungsten filament. Advantageously, the glass or fused quartz sheath of the light source 158 is thin enough such that the temperature response is satisfactory for obtaining the desired radiation transmission.

In addition to the glass or fused quartz sheath having good emission characteristics for use in the cas analyzing means 54, the relatively large surface area of the sheath enables ample infrared energy to be produced at much lower temperatures than are typically employed in prior art analyzers. Because the temperature coefficient of resistance ratio of the tungsten filament would result in large surge currents and short life of the source 158 if a regulated voltage was employed to energize the source 158, current regulation is employed wherein the current is regulated at a fixed level which is substantially less than the normal working voltage of the source 158. By using such current regulation and operating the source 158 at less than its rated voltage, the life of the light source 158 is typically extended to a time period greater than 10,000 hours. When the source 158 is pulsed in the aforementioned manner, infrared radiation is passed through the gas sample in the optical path. The radiation then passes through the optical filter 164 which eliminates interfering wavelengths and is received into the infrared sensor 166 which essentially counts the number of absorbing gas molecules to provide a measurement of the carbon dioxide level of the gas sample.

After the carbon dioxide level of the gas sample has been measured in the aforementioned manner, the gas sample is subsequently introduced into the circulation chamber 180 via the inlet passage 126. Thereafter, a portion of the gas sample enters into the oxygen sensor 176 via the gas inlet 178. As previously specified, the oxygen sensor 176 operates on an electrochemical principle based on the reduction of oxygen ions to produce a current. Particularly, the oxygen of the gas sample diffuses through a membrane contained within the oxygen sensor 176 to an electrolyte which forms an oxygen ion. The rate of diffusion is a function of the concentration of the oxygen within the sample. The oxygen ion is reduced at an electrode to produce an electrical current that is proportional to the oxygen concentration in the gas sample. After passing into the oxygen sensor 176, the gas sample passes from the circulation chamber 180 into the outlet passage 128 which is in fluid communication therewith. Thereafter, the gas sample passes through the outlet passage 128 and through the outlet fitting 136 into the pitot tube 60 or tubes 66. As previously explained, the gas sample is then reintroduced into the interior of the refrigerated container 10 via the open distal tip 62 of the Pitot tube 60 or open distal tips 70 of the tubes 66.

As previously explained, to insure proper operation of the present system, the gas analyzing means 54 must be periodically calibrated. For such calibration to occur, both the infrared sensor 166 and oxygen sensor 176 need to have gases of known concentrations of carbon dioxide and oxygen periodically introduced thereinto to check for proper performance and to provide a basis for recalibration if necessary. As can be appreciated, the oxygen analyzer 176 will produce no current in the absence of oxygen ions. Therefore, the zero for the oxygen sensor 166 is stable. However, the span varies with temperature, membrane condition and age.

In infrared analyzers, the energy of the optical beam is typically attenuated less than twenty percent (20%) by a full scale concentration of the analyte. Prior art infrared analyzers typically employ either dual optical beams, dual sources, or dual detectors to balance the signal to reduce the effects of changes in source emissions, optical path transmission, detector sensitivity, and amplifier gain. Anything that affects the balance of these analyzers also affects the output signal. For this reason, two point calibration using two calibrant gases is typically required. For the infrared analyzer 56 of the present invention, a single calibrant gas is sufficient. The effect of changes in the infrared sensor 166 sensitivity, optical path 146 transmission, amplifier gain, and source 158 emission affect the zero reading. By using a calibrant gas having no absorption at the wavelengths the infrared sensor 166 is responsive to, one point is established by zero signal.

The problems of stability are overcome by frequent calibration using ambient air as a calibrant gas. By setting limits for the output signal under these conditions the proper functioning of all the infrared analyzer elements are checked. This provides means for determining the accuracy and proper functioning of the infrared analyzer of the present invention.

As will be further recognized, by use of the gas analyzing means 54 of the present invention, the carbon dioxide and oxygen levels are measured via a series flow path with the carbon dioxide measurement initially being taken and the oxygen level measurement subsequently being taken due to the flow pattern of the gas sample through the housing 100. Since both the infrared sensor 166 and oxygen sensor 176 are adversely affected by temperature variations, the placement of the gas analyzing means 54 within the interior of the refrigerated container 10 provides a low, controlled temperature environment which facilitates proper operation of the gas analyzing means 54. However, since the interior of the container 10 is frequently washed with cleansing agents, the sensing components of the gas analyzing means 54 must be protected from liquid and/or vapor penetration. As previously specified, the attachment of the lid member 122 to the flange 114 and the attachment of the cover 168 to the flange 142 protects the sensing components from such exposure. Additionally, the use of the first chamber 102 as a junction box and the extension of a single sealed cable therefrom further protects the sensing components from exposure to liquid or vapor.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A method for maintaining controlled concentrations of oxygen and carbon-dioxide gas within a refrigerated shipping container, said method comprising the steps of:
   (a) measuring the carbon-dioxide and oxygen concentrations of gas within the refrigerated shipping container by utilizing a circulation fan of the refrigerated shipping container to effect the flow of gas, so as to obtain a sample thereof;
   (b) varying the concentrations of carbon-dioxide and oxygen within the shipping container in response to such measuring, so as to maintain controlled concentrations thereof; and
   (c) ceasing measurement of the carbon-dioxide and oxygen concentrations of gas within the refrigerated shipping container when the air circulation fan of the refrigerated shipping container is not operating.

2. The method as recited in claim 1 wherein the step of measuring the carbon-dioxide and oxygen concentration of gas within the refrigerated shipping container by utilizing the air circulation fan comprises:
   a) drawing a gas sample from an inlet disposed within the refrigerated shipping container, the gas sample being drawn into the inlet by low pressure formed by the air circulation fan;
   b) communicating the gas sample to carbon-dioxide and oxygen sensors; and
   c) sensing the carbon-dioxide and oxygen concentrations of the gas samples.

3. The method as recited in claim 1 wherein the step of utilizing the air circulation fan to effect the flow of gas comprises utilizing suction generated by the air circulation fan to effect the flow of gas.

4. The method as recited in claim 1 wherein the step of utilizing the air circulation fan to effect the flow of gas comprises utilizing a pitot tube for generating suction to effect the flow of gas from within the refrigerated shipping container to the gas analyzer.

5. The method as recited in claim 1 wherein the step of utilizing the air circulation fan to effect the flow of gas comprises utilizing a pitot tube disposed within an air stream of the air circulation fan of the refrigerated shipping container.

6. The method as recited in claim 1 wherein the step of measuring the carbon-dioxide and oxygen concentrations of gas within the refrigerated shipping container comprises measuring the carbon-dioxide and oxygen concentrations via carbon-dioxide and oxygen sensors located within the refrigerated shipping container, location of the carbon-dioxide and oxygen sensors within the refrigerated shipping container providing a stable and controlled environment therefor.

7. The method as recited in claim 1 wherein the step of utilizing the air circulation fan to effect the flow of gas comprises utilizing a pair of tubes for generating suction to effect the flow of gas from within the refrigerated shipping container to the gas analyzer.

8. The method as recited in claim 1 wherein the step of utilizing the air circulation fan to effect the flow of gas comprises utilizing a pair of tubes disposed within an air stream of the air circulation fan of the refrigerated shipping container.

* * * * *